United States Patent [19]

Yamazaki

[11] Patent Number: 5,757,496
[45] Date of Patent: May 26, 1998

[54] METHOD OF SURFACE ROUGHNESS MEASUREMENT USING A FIBER-OPTIC PROBE

[75] Inventor: Kazuo Yamazaki, El Macero, Calif.

[73] Assignee: Mitutoyo Corporation, Japan

[21] Appl. No.: 812,598

[22] Filed: Mar. 7, 1997

[51] Int. Cl.$^6$ ................................................ G01B 11/30
[52] U.S. Cl. .................................. 356/371; 356/373
[58] Field of Search ................................ 356/371, 373, 356/376, 445, 446; 250/227.11, 227.21, 227.23, 227.28, 227.24, 231.1; 385/12

[56] References Cited

U.S. PATENT DOCUMENTS

| | | | |
|---|---|---|---|
| 4,254,331 | 3/1981 | Dorman et al. | 250/205 |
| 4,674,882 | 6/1987 | Dorman et al. | 250/548 |
| 4,692,611 | 9/1987 | Hoogenboom | 250/559.38 |
| 5,410,410 | 4/1995 | Yamazaki et al. | 356/376 |
| 5,410,413 | 4/1995 | Sela | 356/446 |
| 5,453,838 | 9/1995 | Danielian et al. | 356/371 |

FOREIGN PATENT DOCUMENTS

| | | | |
|---|---|---|---|
| 0071609 | 4/1988 | Japan | 356/371 |
| 1315803 | 6/1987 | U.S.S.R. | 356/371 |

OTHER PUBLICATIONS

"The fiber–optic instrument for extremely small roughness measurement", A. Domanski et al., *SPIE vol. 670 Optical Fibres and Their Applications IV* (1986), pp. 116–118.

"A novel non–contact sensor for surface topography measurement using a fibre optic principle", Clive Butler and Gregorios Gregoriou, *Sensors and Actuators A.* 31 (1992), pp. 68–74.

"The method of surface roughness measurement with application of optical fibers", Andrzej W. Domanski et al., *SPIE vol. 670 Optical Fibres and Their Applications IV* (1986), pp. 119–112.

Primary Examiner—Hoa Q. Pham
Attorney, Agent, or Firm—Webb Ziesenheim Bruening Logsdon Orkin & Hanson, P.C.

[57] ABSTRACT

A method of surface roughness measurement is disclosed which uses a fiber-optic probe having a sensor head constituted of a light-emitting fiber and multiple light-receiving fibers disposed coaxially with the light-emitting fiber. The surface roughness measurement includes the steps of: (a) pre-measuring a first correlation between detected intensity and gap distance for each of reference samples obtained under a plurality of different processing conditions; (b) searching a second correlation between maximum intensity and surface roughness for each of the reference samples, based on the first correlation, and storing the second correlation in memory; (c) adjusting the gap distance so as to set the probe in a position at which the maximum intensity is obtained for the reference sample machined under the processing condition to be monitored; and (d) monitoring the maximum intensity of the machined surface at the gap distance set in step (c), and determining the roughness of the machined surface based on the second correlation.

3 Claims, 14 Drawing Sheets

SPECULAR SURFACE

DIFFUSE SURFACE

MIXTURE SURFACE

SMOOTH

SMOOTHER

SMOOTHEST

Ra=0.08

Ra=0.29

Ra=0.66

Ra=1.24

METHOD OF SURFACE ROUGHNESS MEASUREMENT USING A FIBER-OPTIC PROBE

BACKGROUND OF THE INVENTION

1. Field of the Invention

This invention relates to a method of surface roughness measurement using a fiber-optic probe, more particularly to an effective method of on-line surface roughness monitoring in various machining processes.

2. Prior Art

Surface roughness monitoring is an important aspect of quality assurance of manufacturing processes. Besides, surface roughness can also be used as an indicator for diagnosing deterioration factors such as tool wear and vibration of machining process as well.

Recent evolution of machine tools is achieving higher accuracy and higher productivity by utilizing high speed and intelligent functions. This allows more integrated machining operation in a single process with shorter machine time. Since sophisticated geometry can be machined in a short time, it is important to check the quality of the machined workpiece and to diagnose the machining process right after the workpiece comes out from the machining process and before goes to next process. In order to realize time-efficient production and process quality control while keeping highest productivity possible, high-speed, on-line or in-process quality monitoring system is critical.

From such a viewpoint, a fiber-optic based non-contact surface roughness measuring method is proposed, which is simple, fast and easy to implement and easy to perform on-line measurement.

The fiber-optic method was proposed by A. W. Domanski, M. A. Karpierz et al. in 1986 (A. W. Domanski, M. A. Karpierz, T. J. Rzysko, 1986, The method of surface roughness measurement with application of optical fibers, SPIE Vol. 670 Optical Fibers and Their Application IV, 119–122). In their system, light from a low coherence diode should be coupled to a multi-mode fiber, a detecting multi-mode fiber is held symmetrically. Based on some assumptions such as certain kind of surface model etc. and some simplification, a simple relation between the scattering light intensity and certain roughness parameters such as rms roughness slope Rq can be obtained theoretically and experimentally.

In the same year, A. W. Domanski, W. Ejehart et al. proposed another fiber-optic method (A. W. Domanski, W. Ejehart et al., 1986, The fiber-optic instrument for extremely small roughness measurement, SPIE Vol. 670 Optical Fibers and Their Applications IV, 116–118). This method works in the range of profile mean deviation 20 nm<Ra<150 nm. In this method, light is led by the fiber to the surface and is analyzed by other fiber fixed in a focal plane of the lens. This method is used to check the base plate in microelectric semiconductor techniques. Since the amplitude of the measured signal is greatly dependent on the reflection properties of the material the surface is made of, calibration is need.

In 1989, A. W. Domanski, T. R. Wolinski et al. proposed a fiber-optic surface roughness measurement method based on polarization measurements (A. W. Domanski, T. R. Wolinski et al., 1989, Fiber-optic surface roughness sensor based on polarization measurements, SPIE Vol. 1169, Fiber Optic Laser Sensors VII, 558–566).

Clive Butler and Gregorios Gregoriou in 1992 proposed a fiber-optic sensor for surface topography measurement (Clive & Gregorios Gregoriou, 1992, A novel non-contact sensor for surface topography measurement using a fiber-optic principle, Sensors and Actuators A.31 (1992) 68–72) and in 1994 reported the performance evaluation of the sensor (Clive & Gregorios Gregoriou, 1994, Performance evaluation of a novel non-contact fiber-optic triggering probe for surface-topography measurement, Sensors and Actuators A.41–42 (1994), 98–101). In this system, a beam emitted by a laser diode at the side surface is split by a beam splitter and directed onto the sample surface as a 150 μm spot using a lens. Light reflected from the surface passes through a beam splitter and is collected at a fiber bundle. The correlation between the detected light intensity and the distance from the sensor focal plane to the measured surface can be obtained. Theoretical model of this method is based on geometric optics of lens. This method is used to measure the surfaces of nylon, acrylic resin and various other materials, but they only measured only surface step height around 500 μm and no any surface roughness parameters were involved.

It has been reported that using a fiber-optic sensor to observe the diffraction pattern of a surface-machined sample enables easy identification of a machined surface (Shetty, D., and Neault, H., 1993, Method and Apparatus for Surface Roughness Measurement Using Laser Diffraction Pattern, U.S. Pat. No. 5,189,490).

SUMMARY OF THE INVENTION

An object of the invention is to provide a method of surface roughness measurement that enables monitoring of surface roughness unaffected by the texture orientation of the machined surface utilizing a simple and inexpensive fiber-optic probe and, particularly, to such a method that can be advantageously applied to on-line measurement of the machining process.

The method of surface roughness measurement using a fiber-optic probe according to the present invention, wherein said probe has at least one sensor head constituted of a light-emitting fiber and multiple light-receiving fibers disposed coaxially with the light-emitting fiber, the method comprising the steps of: (a) directing a light beam from the sensor head onto each of multiple reference samples machined under a plurality of different processing conditions, and pre-measuring a first correlation between detected intensity and gap distance for each of the reference samples, the detected intensity being defined as a sum of outputs of the light-receiving fibers, the gap distance being defined as a distance between the sensor head and a surface of the reference sample; (b) searching a second correlation between maximum intensity defined as a peak of the detected intensity in a predetermined range of the gap distance and surface roughness, based on the first correlation obtained in step (a), and storing the second correlation in a memory; (c) adjusting the gap distance so as to set the probe in a position at which the maximum intensity is obtained, based on the first correlation for the reference sample machined under the processing conditions to be monitored; and (d) monitoring detected intensity obtained at the gap distance set in step (c) for a to-be-measured sample, and determining surface roughness thereof based on the second correlation stored in the memory in advance.

In accordance with the present invention, there is obtained a non-contact method of surface roughness measurement using a fiber-optic probe. A standard surface and a machined surface were used to confirm the effectiveness of the invention and a good correlation was obtained between the detected light intensity and surface roughness. The conclusion was that the method of this invention is effective as an on-line surface roughness monitoring method applicable to a production machining system such as a CNC machining center.

DETAILED DESCRIPTION OF THE PREFERRED EMBODIMENTS

Figure 1A:
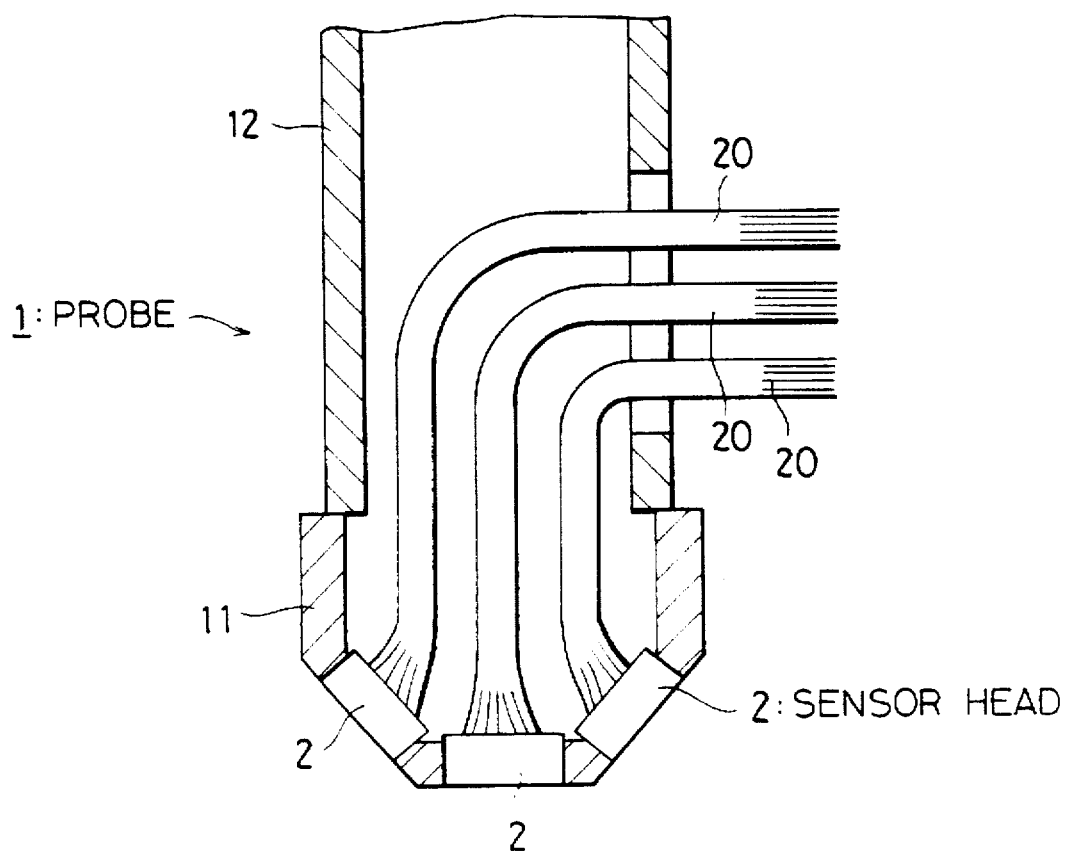
FIGS. 1A and 1B are a sectional view and a bottom view of a fiber-optic probe 1 used in an embodiment of this invention.
Figure 1B:
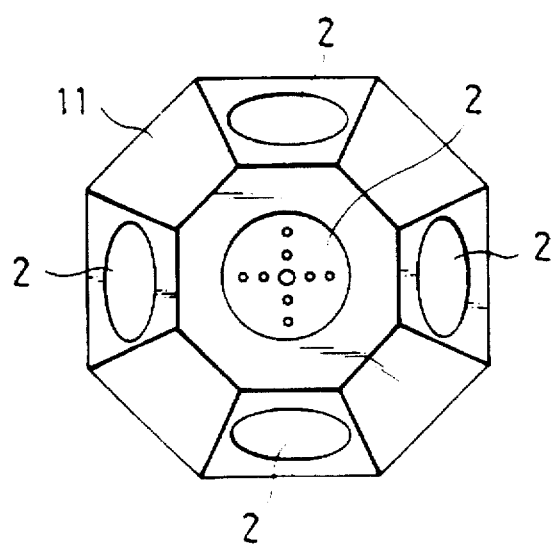

FIGS. 1A and 1B are a sectional view and a bottom view of a fiber-optic probe 1 used in an embodiment of the present invention. The probe 1 is the same as that used in the measuring apparatus for measuring three-dimensional shape proposed earlier by the inventors and disclosed in U.S. Pat. No. 5,410,410. The fiber-optic probe 1 comprises a probe base 11 and a case 12 serving as a support body for attachment to a CNC or other such machine tool. Five sensor heads 2 are embedded in the probe base 11. One of the sensor heads 2 is disposed at the center of the tip of the probe base 11, and the other four sensor heads are disposed with their head surfaces inclined to surround the central sensor head.

Figure 2A:
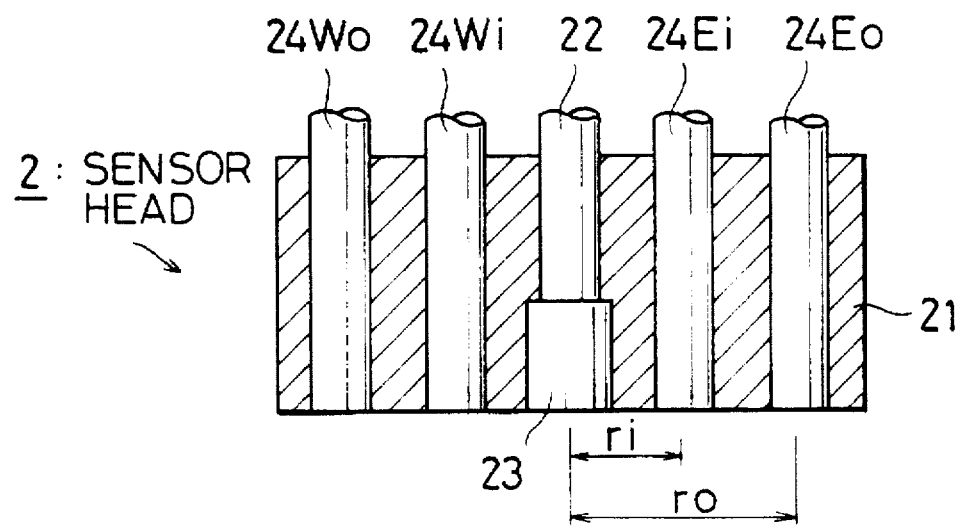
FIGS. 2A and 2B are a front sectional view and a bottom view of the sensor head of the same probe.
Figure 2B:
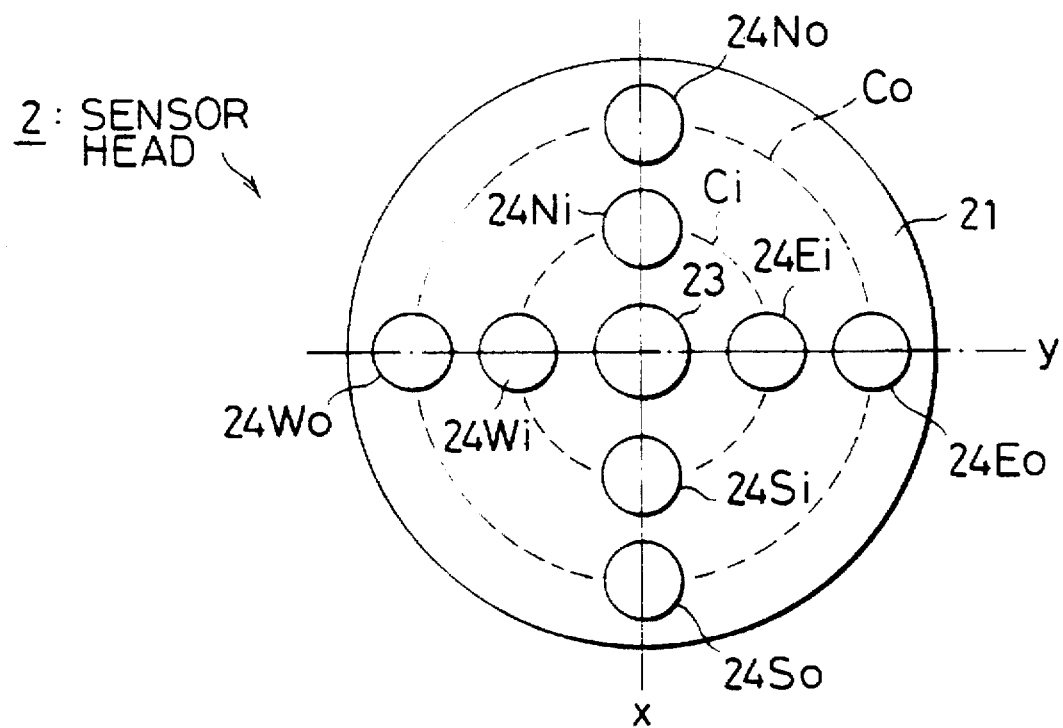

As shown in the front sectional view of FIG. 2A and the bottom view of FIG. 2B, each sensor head 2 comprises nine fibers embedded in a head base 21. The fiber 22 at the center is a light-emitting fiber, and has a SELFOC microlens 23 attached the tip thereof. Eight light-receiving fibers 24 are symmetrically disposed with respect to the emitting fiber 22 at the center. The inner four receiving fibers 24Ni, 24Si, 24Ei and 24Wi are disposed on intersections between a circle Ci of radius ri and x and y axes passing through the center of the head surface, and the outer four receiving fibers 24No, 24So, 24Eo and 24Wo are disposed on intersections between a circle Co of radius ro and the x and y axes. Fibers having an NA of 0.47 are used as the fibers 22, 24. As the light source coupled with the emitting fiber 22 there is used a compact, high-output LED (wavelength: 637 nm).

The end surface (emitting end) of the microlens 23 and the end surfaces (detecting ends) of the light-receiving fibers 24 are aligned in the same plane. The distance ri between the emitting fiber 22 and inner receiving fibers 24Ni–24Wi and the distance ro between the emitting fiber 22 and the outer receiving fibers 24No–24Wo exert a large effect on the shapes of the received light intensity versus gap distance curve, as explained later, and this is directly related to the dynamic characteristics of the sensor head. In the actually fabricated sensor head, $2ri=2.75$ mm and $2ro=5.25$ mm, while the diameter of the light-receiving fibers 24 was 0.75 mm, that of the light-emitting fiber 22 was 0.5 mm and that of the microlens 23 was 1.0 mm.

The fiber bundles 20 of the individual sensor heads 2 are led to the outside through the case 12, as shown in FIG. 1A, and connected to the light source and a photosensor.

Figure 3:
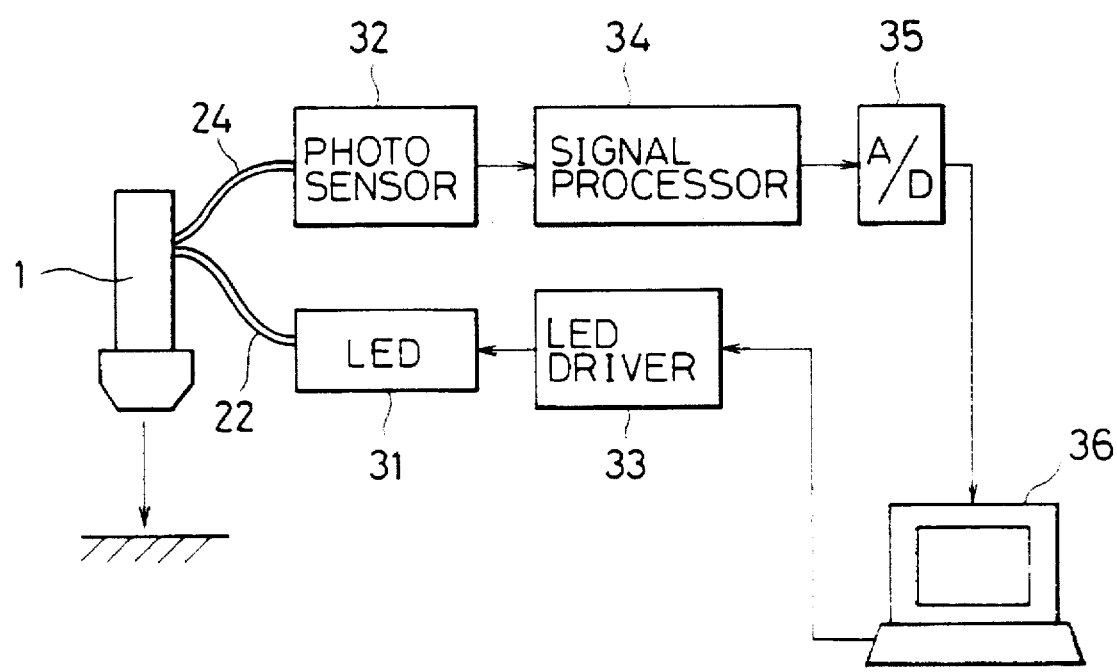
FIG. 3 shows a measurement system of this embodiment.

FIG. 3 shows a system configuration for conducting surface roughness monitoring. The light-emitting fiber 22 of the fiber-optic probe 1 is coupled with an LED 31 and the light-receiving fibers 24 are coupled with a photosensor 32. The LED 31 is driven by an LED driver 33 controlled by a computer 36. The output of the photosensor 32 is amplified, subjected to filtering and other such processing by a signal processor 34, converted to digital data by an A/D converter 35, and input to the computer 36. When the fiber-optic probe 1 is attached to a computer-controlled machine tool, the computer 36 is the control computer of the machine tool.

In the present invention, surface roughness monitoring is conducted by detecting the reflected light intensity of the surface to be measured using the fiber-optic probe 1. Although the probe 1 of FIG. 1 is equipped with multiple sensor heads 2 for the purpose of three-dimensional shape measurement, monitoring of the surface roughness of a single surface can be performed by using only a single sensor head, e.g., the center one. The principle of surface roughness monitoring using a single sensor head will now be explained in detail.

Figure 4A:
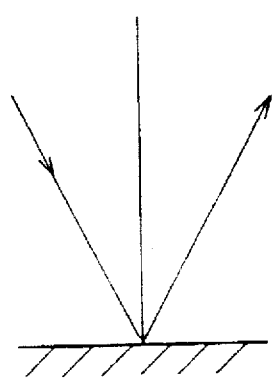
FIGS. 4A, 4B and 4C show reflection modes of different sample surfaces.
Figure 4B:
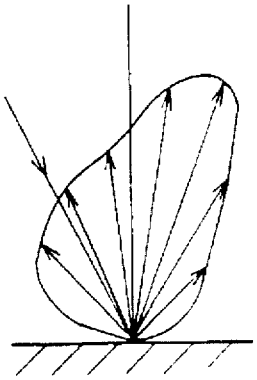
Figure 4C:
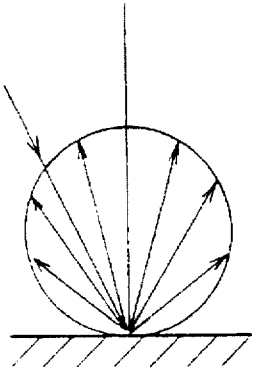

Reflected light intensity ordinarily depends on numerous factors such as the reflectivity and roughness of the surface, the surface texture orientation and the like. As regards the machined surface of a specific sample, the reflected light intensity is affected mainly by the machining process, the surface roughness and the texture orientation. Generally, scattering from a surface should be treated using vector scattering theory, but unfortunately, the vector methods are extremely tedious and prone to misinterpretation. There are two possible alternatives. One is the scalar theory, the other is based on geometric optics. If the surface roughness is much smaller than the wavelength of the incident light, the geometrical optics can be adapted. FIGS. 4A–4C show three different types of surface scattering: (a) reflection from a specular surface without scattering, (b) scattering from a diffuse surface, and (c) scattering from a surface of mixture of specular and diffuse surface.

For most engineering surface, the roughness is greater than the wavelength of the incident light source for such kind of measurement, the whole surface can not be treated as a geometrically smooth surface. However, such a surface can be treated as a combination of a number of small facets, and for each facet, geometric optics applicable provided the edge effect is ignored. The facet method is not easy, however, since the quantitative relationship between reflected light intensity and surface roughness is hard to obtain since both height and slope information of each facet are involved.

In our approach, therefore, the following assumptions are made:

(1) The light intensity distribution reflected from a surface is approximated by an ellipse.

Figure 5A:
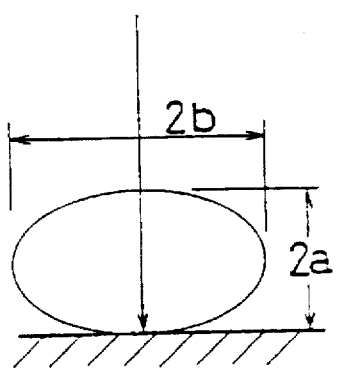
FIGS. 5A, 5B and 5C show elliptical distribution of scattered reflected light.
Figure 5B:
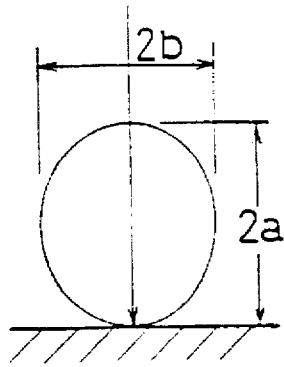
Figure 5C:
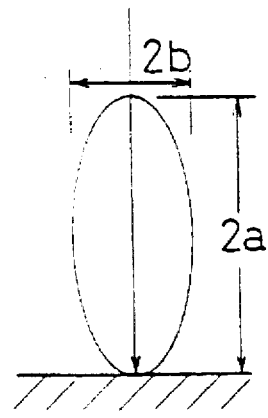

(2) The total incident light intensity is approximated by the area of the ellipse and the scattering property is represented by the shape of the ellipse, for example, by the ratio of the semi-axes a, b of the ellipse, so that, as shown in FIGS. 5A–5C, the bigger is the ratio a/b, the smoother is the surface.

(3) The scattering property is fully determined by the surface roughness and the texture orientation for the same material and the same machining process.

(4) Based on the above three assumptions, the surface can be treated as a geometrically smooth surface.

With the above four assumptions, the reflected light intensity can be related to the surface roughness of the surface to be measured.

The ellipses of different shapes shown in FIGS. 5A–5C can be produced by a simulation model according to the above assumptions and a correlation between the surface roughness and the ratio of the semi-axes a, b.

Figure 6:
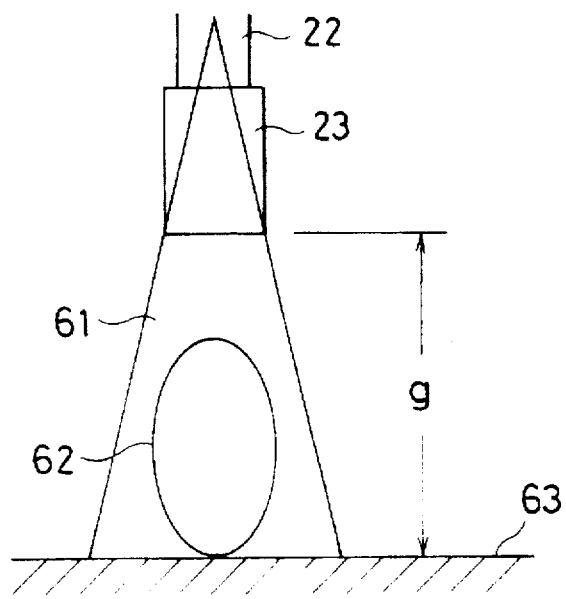
FIG. 6 shows the relationship between the illuminating beam and reflected light intensity distribution.

As shown in FIG. 6, the beam 61 emitted from the lens 23 of the sensor head 2 is conical in shape and all rays of the beam 61 are reflected from the surface 63 to be measured and form a reflection intensity distribution of an ellipse 62 based on the above assumptions.

Figure 7A:
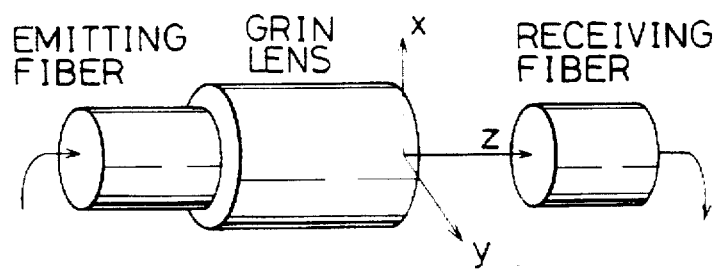
FIGS. 7A and 7B show a measurement method for reflected light intensity measurement.
Figure 7B:
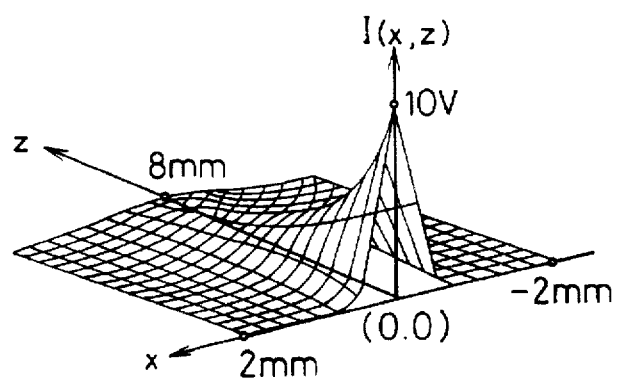

An experimental equation representing the beam intensity I (x, z) was obtained as the following equation (1) from measured results which is shown in FIGS. 7A and 7B (Yamazaki, Kee Sein Lee, et al., 1993, Non-contact Probe for Continuous Measurement of Surface Inclination and Position Using Irradiation of Light Beam, Annals of the CIRP, Vol.).

$$I(x,z) = \frac{23.83K}{(z+0.66)^2} \exp\left(\frac{-34.33x^2}{(z+0.66)^2}\right) \quad (1)$$

Figure 8:
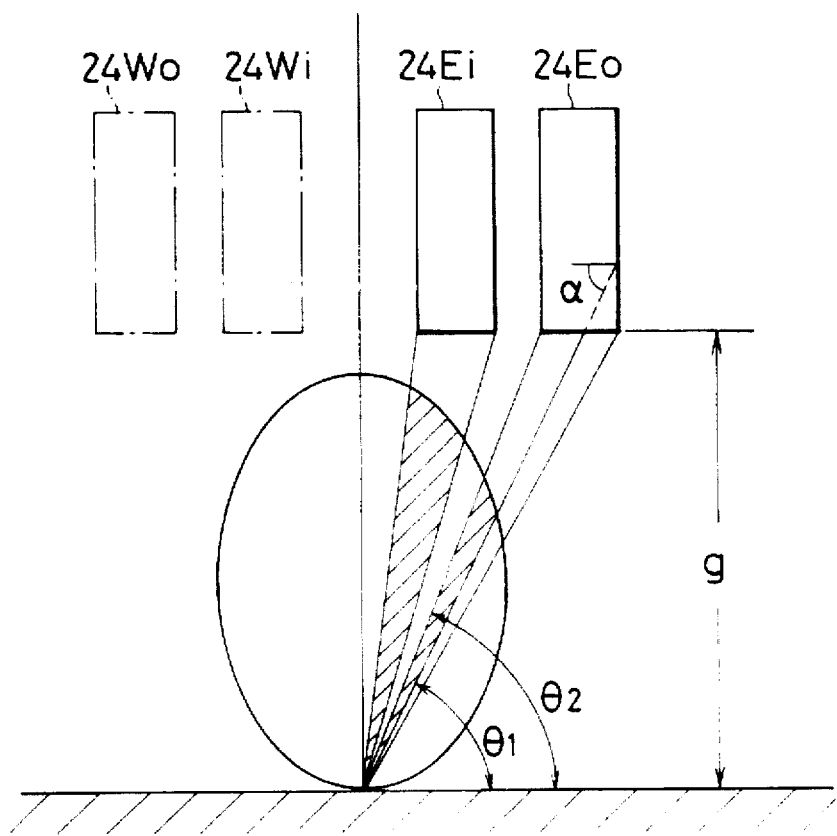
FIG. 8 shows the principle of reflected light intensity detection.

The principle of light intensity detection is shown in FIG. 8. In FIG. 8, the light-receiving state is shown with reference to the two light-receiving fibers 24Ei, 24Eo on the y axis of the head surface shown in FIG. 2B. Whether or not reflected light is detected by a light-receiving fiber depends on the fiber diameter and the critical angle $\alpha$. The intensity that can be detected by the light-receiving fiber is represented by the detectable area in the reflected intensity ellipse. To determine the detectable area, we must consider the shaded area in FIG. 8 which are the intersection area of the ellipse and the straight line segments from the receiving fibers. If a shaded area within the critical angle $\alpha$ of the receiving fiber, the area is considered to the detectable area and can be used for simulating the detected light intensity by the sensor head. The detectable area can be calculated using the following formula (2):

$$\int_{\theta_1}^{\theta_2} \frac{2a^2b^4 \sin^2(\theta)}{(a^2 \cos^2(\theta) + b^2 \sin^2(\theta))^2} d\theta \quad (2)$$

where a and b are the semi-axes of the ellipse of the reflected light intensity distribution and can be chosen according to the reflection characteristic of the surface to be measured. The integral can be calculated using the following equation (3):

$$A = b^2 \left(\frac{a}{b} \tan^{-1}\left(\frac{\tan(\theta)}{a/b}\right) - \frac{(a/b)^2 \tan(\theta)}{\tan^2(\theta) + (a/b)^2}\right)\bigg|_{\theta=\theta_1}^{\theta=\theta_2} \quad (3)$$

A detectable region of the ellipse exists for each of the 8 independent light-receiving fibers, and these are summed. Our previous work has shown that the summation of the detectable areas such calculated and the actual intensities detected by each receiving fiber had a very close agreement (Y. Yang and K. Yamazaki, 1996, Error Analysis by Simulation for a Fiber Based Non-contact Measurement Probe System, Proceedings of ASPE Annual Meeting, 1996). Premised on the principle of reflected light intensity set out above, the concrete relationship among surface roughness, detected intensity, gap distance and the like, which is the premise underlying the monitoring of surface roughness according to the present invention, will now be explained. The sum of the outputs detected by the light-receiving fibers when the to-be-measures surface is illuminated by light from the sensor head will hereinafter be referred to as simply the "detected intensity."

Relation Between Detected Intensity and Surface Roughness

Figure 9:
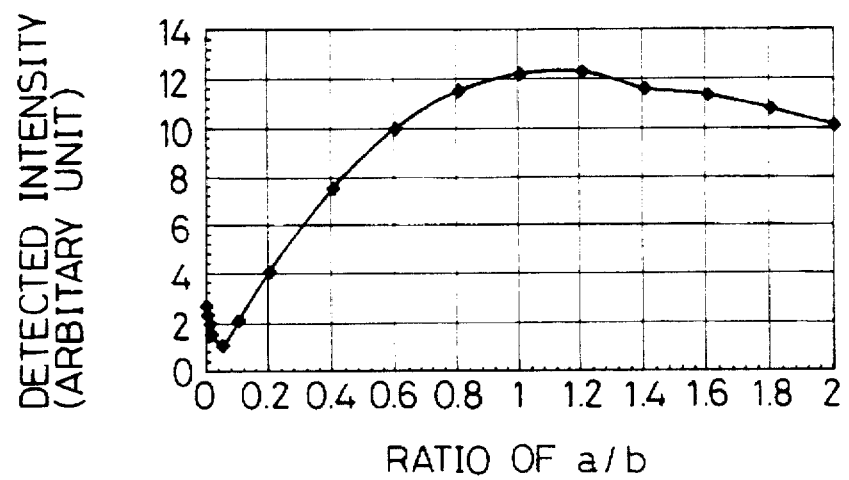
FIG. 9 shows the correlation between detected intensity and elliptical distribution.

The quantitative relationship between the detected intensity of the sensor head and the diameter ratio a/b of the ellipse was determined by simulation using the above developed method. FIG. 9 shows the relationship.

In FIG. 9, it can be seen that the detected intensity can not monotonously related to the ratio a/b for the whole range of the ratio shown in figure, however, it is either monotonously increasing or decreasing in some specific intervals of the ratio. For example, the detected intensity increases monotonously when the ratio increases from 0.05 to about 1.4, which suggests that a correlation between the detected intensity and the roughness can be used to determine the roughness of the sample surface being measured. However, FIG. 9 also implies that the method of the present invention may not valid for some ranges of roughness values.

Relation Between Detected Intensity and Surface Texture Orientation

Figure 10:
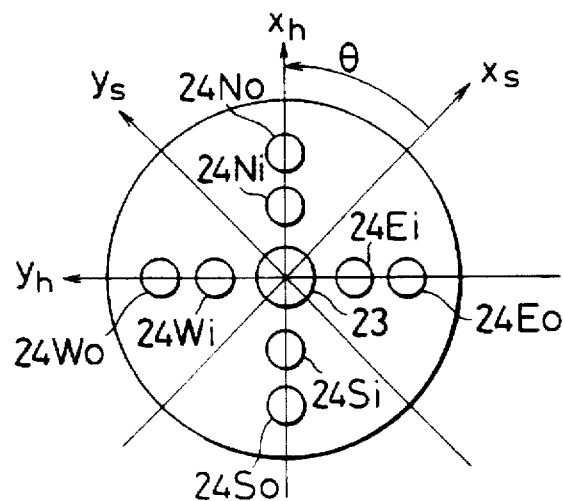
FIG. 10 shows surface texture orientation.

Different machine processes will produce different textures on the surface machined. Usually, the scattering intensity distribution depends on the scattering angle, and there will be more scattering in the direction of the surface where the texture is roughest. For example, parallel grooves in a machined surface will scatter almost entirely at right-angles to the direction of the grooves. In other words, the machined surfaces are non-isotropic in terms of scatter. In this case, texture orientation should be taken in consideration when determining surface roughness using scattering methods. In the context, we use the term "surface texture orientation" to mean the relative angle position of two coordinates system xh, yh and xs, ys as shown in FIG. 10. The first system xh–yh is the sensor head coordinate system, the origin is attached at the center of the sensor head, with its z axis coincided with the longitudinal axis of the head. The second system xs–ys is the sample surface coordinate system, the origin of the system is fixed at a measurement position of the surface, with its z axis coincided with the normal of the surface at the measurement point. Obviously, a method which is independent of the surface texture orientation is preferable for on-line machining process monitoring.

Figure 11A:
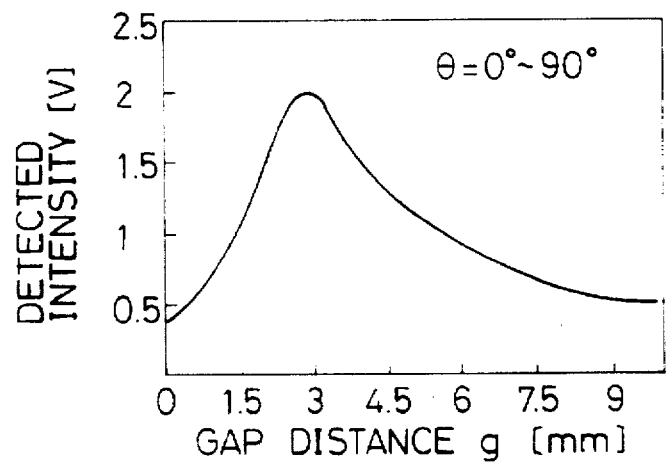
FIGS. 11A and 11B show the relationship between detected intensity and gap distance with surface texture orientation as a parameter.
Figure 11B:
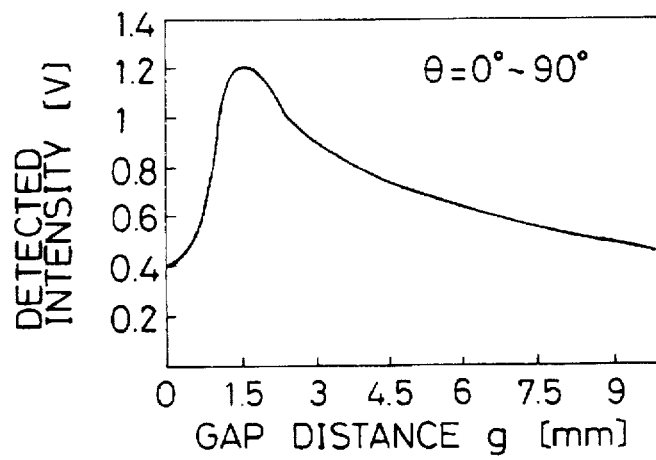
Figure 12A:
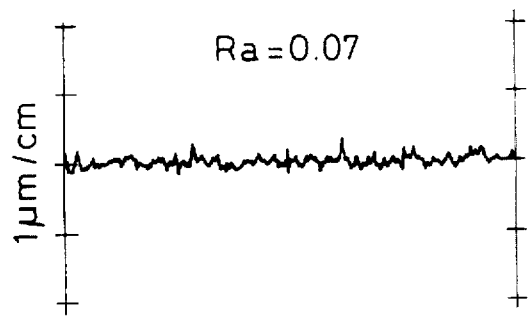
FIGS. 12A–12D show profiles measured with a surface roughness measuring device with respect to ground flat surfaces.
Figure 12B:
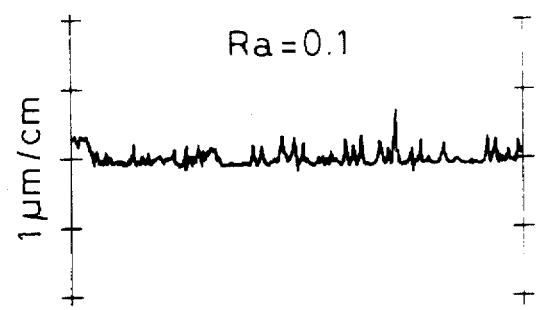
Figure 12C:
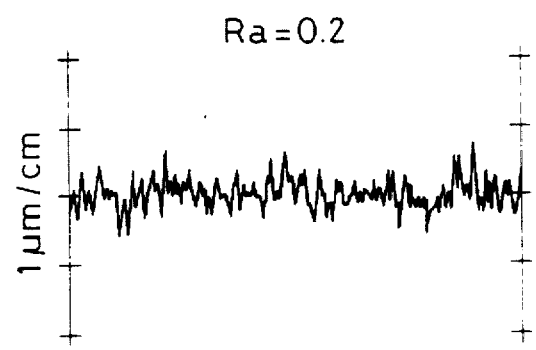
Figure 12D:
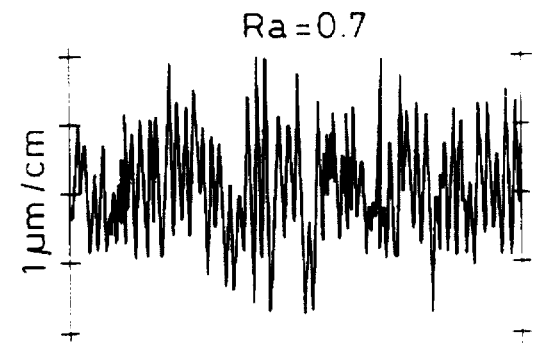

In the method of the present invention, there are eight receiving fibers in the sensor head, four of them are located in north-south direction, the other four in east-west direction. For different orientation of the surface texture, the intensity detected by each receiving fiber is different, however, the sum of the intensities received by the fibers in both directions remains the same at the same gap distance. FIGS. 11A and 11B show the results of gap distance g vs. detected intensity curve against texture orientation angles in the range of θ=0° to 90° for two turning surfaces. From FIGS. 11A and 11B, it can be seen that the peak value of the detected intensity in the gap distance vs. intensity curve is pretty much the same for every orientation angle of θ=0°–90°. Therefore, the peak value of the detected intensity in a predetermined range of the gap distance (hereinafter referred to simply as the "maximum intensity") can be determined by the gap distance g and the roughness of the surface regardless of the texture orientation.

Relation Between Detected Intensity and Gap Distance

Simulation and actual measurement how that the detected intensity depends not only on the roughness but also on the gap distance g between the sensor head and the surface to be measured. Actually, the later has a more substantial influence on the detected intensities. Therefore, in order to uniquely relate the detected intensity to surface roughness, measurement should be taken at the exact gap distance at which the reference measurement is made. This would be very difficult in practical situation and prone to introduce calibration error. Fortunately, the sensor head has the following favorable feature: Although the detected intensity are different at different gap distance for the same surface, the maximum intensity is indeed uniquely associated with the surface itself. For the same type of material and the same type of machining procedure, the maximum intensity are always occurred at the approximately same gap distance. The gap distance associated with the maximum intensity rely primarily on the reflectivity of the surface. Our experiments showed that the gap distances regarding to the maximum intensity are between 3 mm and 5 mm for a wide range of reflectivity of sample surfaces. Therefore, once the correlation between the maximum intensities and the gap distance is obtained, they can be used to determine the roughness of the surface in question. In the experimental configuration, the sensor head was attached to the column of the coordinate measuring machine (CMM) so as to be movable. The maximum intensity can be easily determined through measurement against every gap distance during the moment of the sensor head.

Relation Between Detected Intensity and Roughness Value (Center Line Average Roughness) Ra The detected intensity can be related to different parameters of surface roughness such as Ra (average of the absolute value of the deviation between the average line and the measured curve), Rq (rms of the deviation between the average line and the measured curve), Rp (maximum ridge height) or the like. In our study, a relationship between the detected intensity and the roughness Ra is established.

Figure 13:
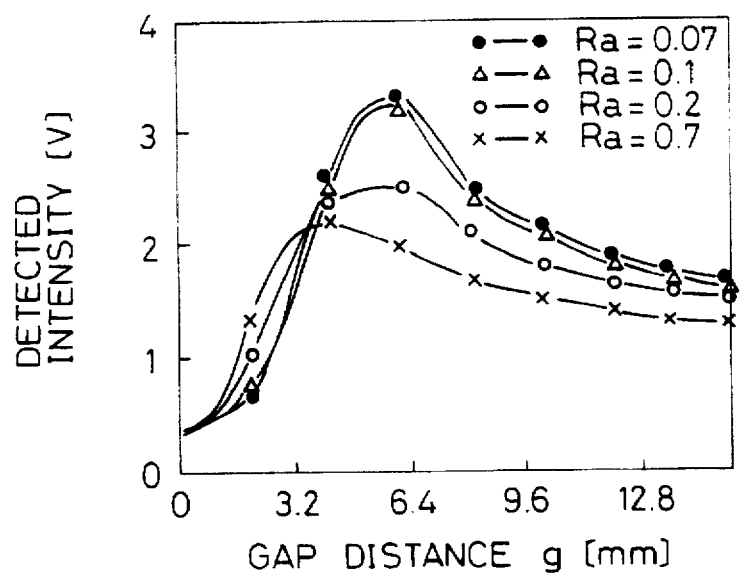
FIG. 13 shows the relationship between intensity detected by the sensor head and gap distance with respect to the ground flat surfaces.
Figure 14:
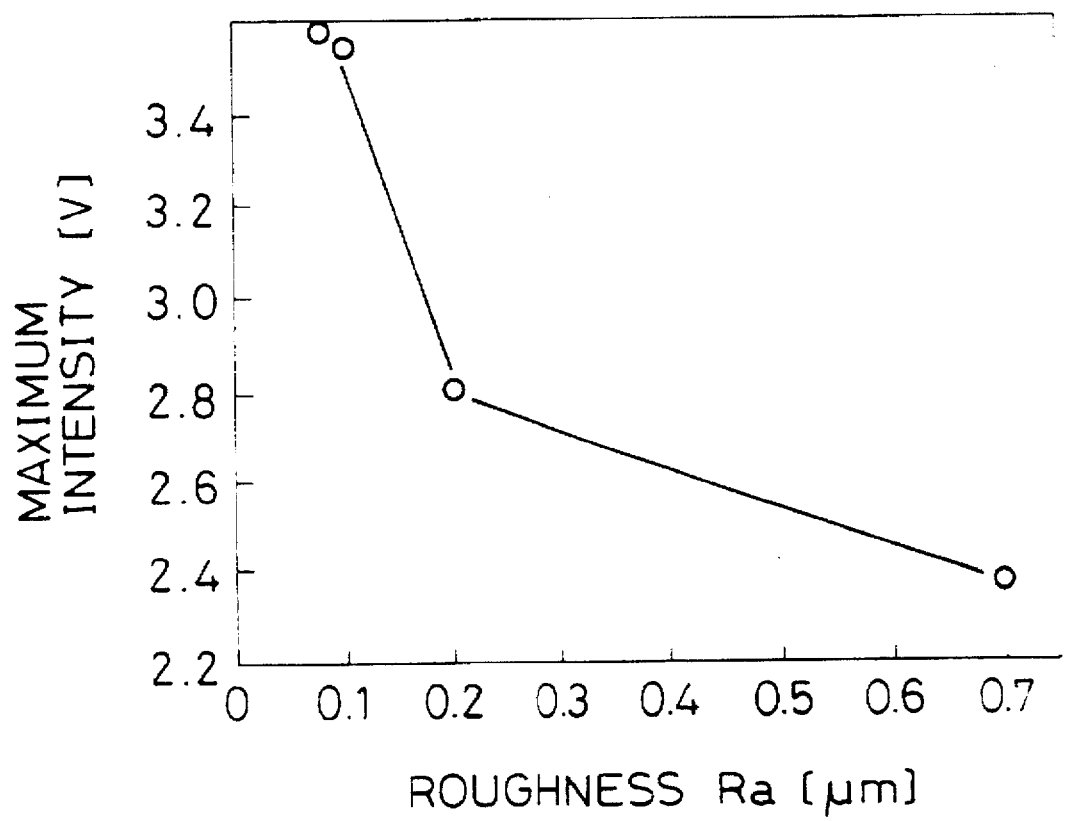
FIG. 14 shows the correlation between the maximum intensity obtained from FIG. 13 and the gap distance.
Figure 15A:
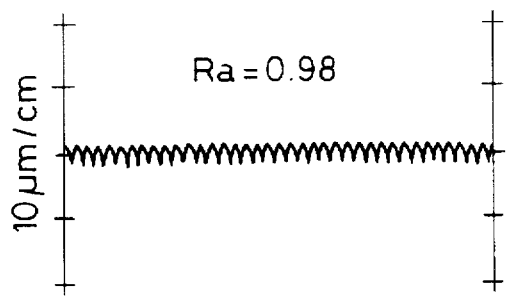
FIGS. 15A–15E show profiles measured with a surface roughness measuring device with respect to milled flat surfaces.
Figure 15B:
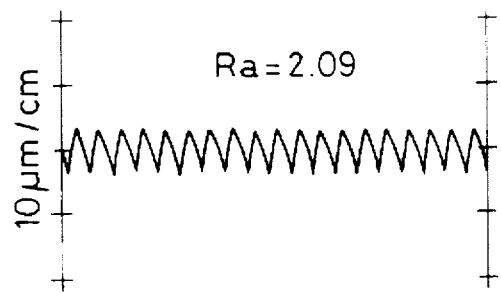
Figure 15C:
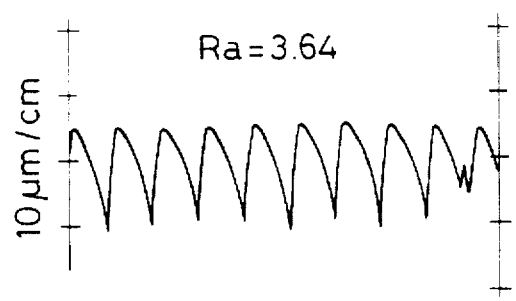
Figure 15D:
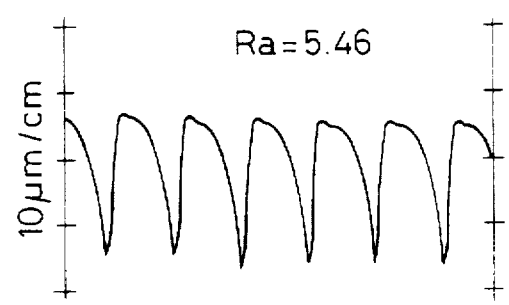
Figure 15E:
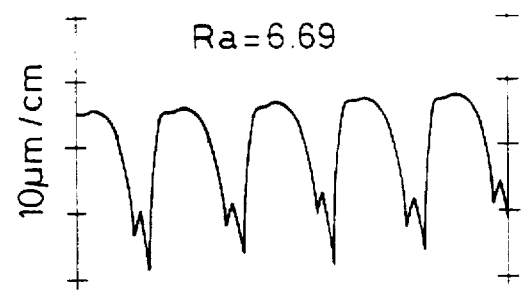

FIGS. 12A–12D show the profiles of four flat ground surfaces (Ra=0.07, 0.1, 0.2, 0.7) measured by Surftest 501 (product of Mitutoyo Corporation). The measurement conditions are: cut-off wavelength λc=0.8 μm; measurement number×4; horizontal multiplication×20; and vertical multiplication×10,000. FIG. 13 shows the measurement curve of detected intensity vs. gap distance. FIG. 14 is the relation curve between the detected maximum intensity and surface roughness Ra.

Figure 16:
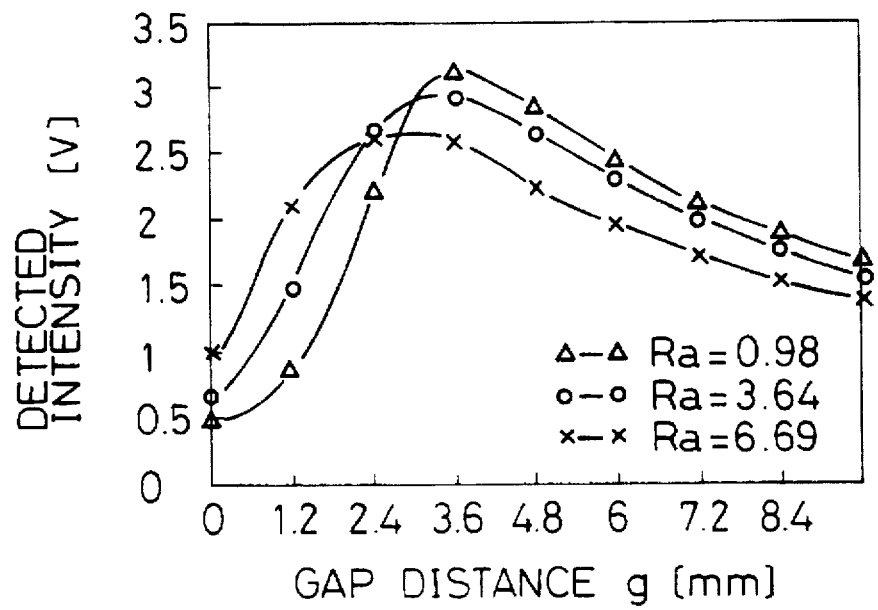
FIG. 16 shows the relationship between intensity detected by the sensor head and gap distance with respect to the milled flat surfaces.
Figure 17:
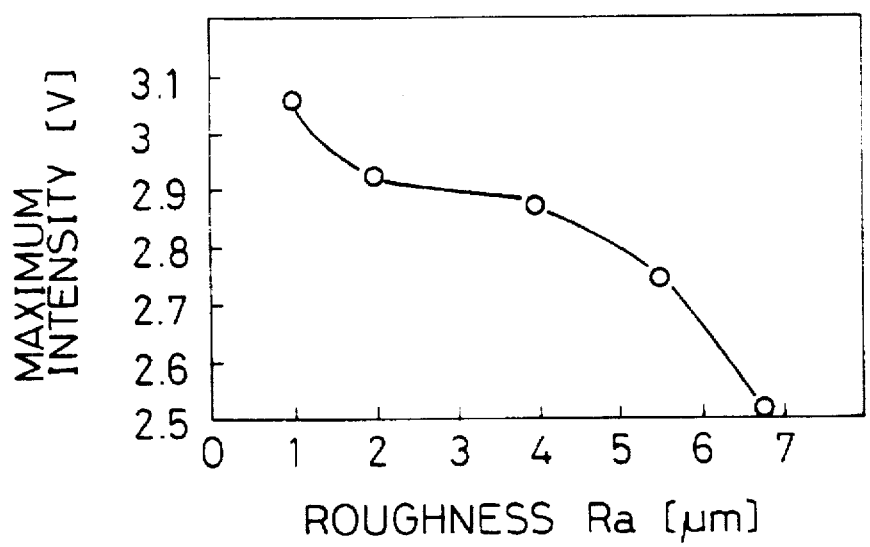
FIG. 17 shows the correlation between the maximum intensity obtained from FIG. 16 and the gap distance.
Figure 18A:
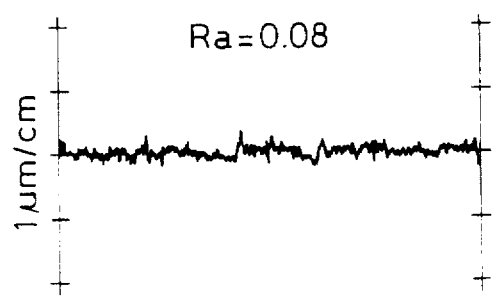
FIGS. 18A–18D show profiles measured with a surface roughness measuring device with respect to curved ground surfaces.
Figure 18B:
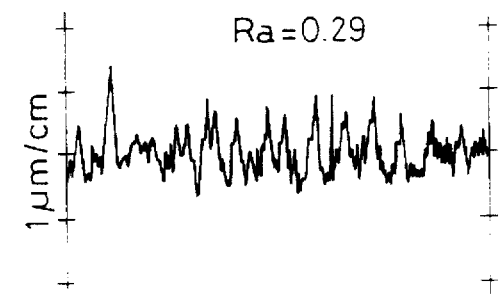
Figure 18C:
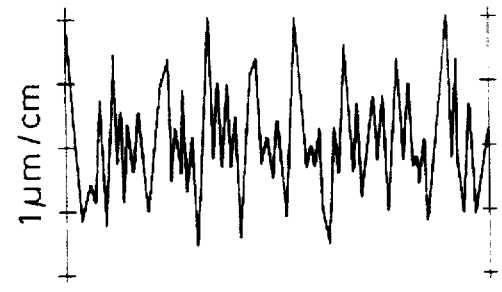
Figure 18D:
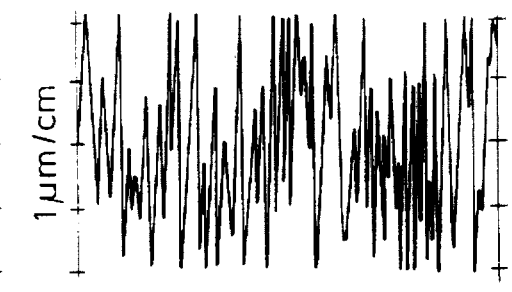

FIGS. 15A–15E show the profiles of five flat milled sample surfaces (Ra=0.98, 2.09, 3.64, 5.46, 6.69) measured by Surftest 501. FIG. 16 shows the measurement curve of detected intensity vs. gap distance for those sample surfaces (with those for the cases of Ra=2.09, 5.46 omitted). FIG. 17 is the relation curve between the detected maximum intensity and the roughness Ra.

Figure 19:
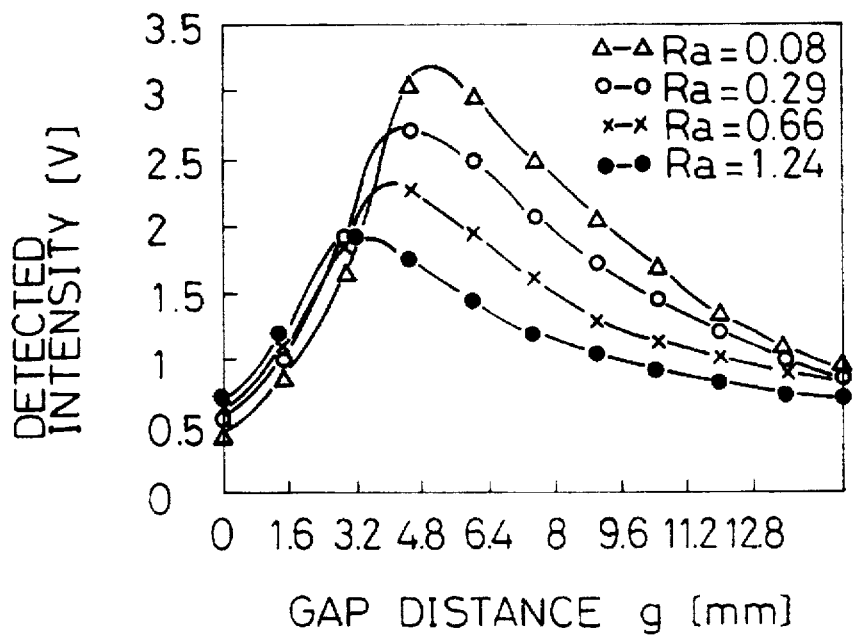
FIG. 19 shows the relationship between intensity detected by the sensor head and gap distance with respect to the curved ground surfaces.
Figure 20:
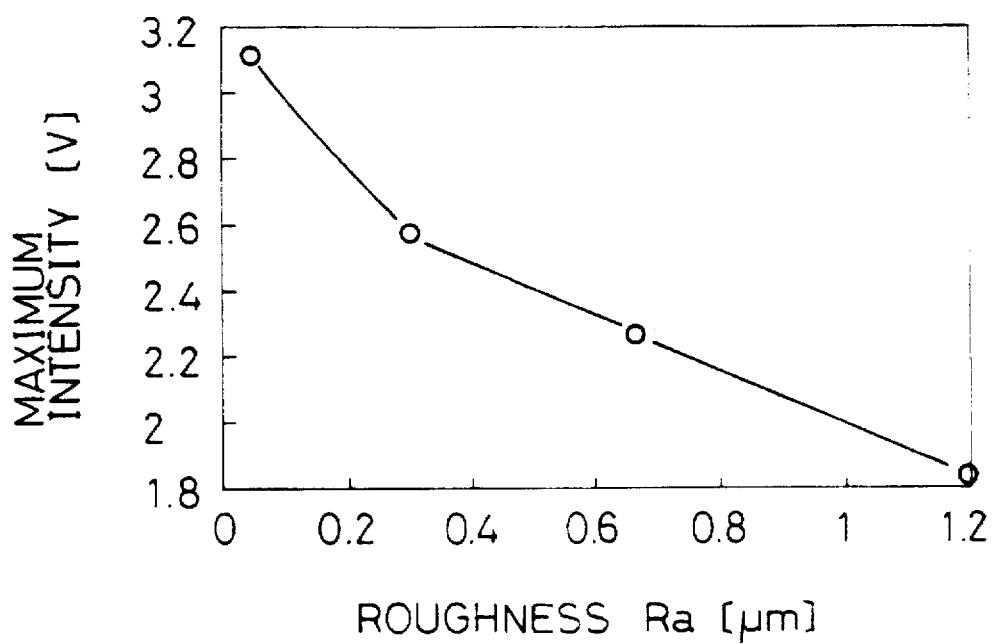
FIG. 20 shows the correlation between the maximum intensity obtained from FIG. 19 and the gap distance.

FIGS. 18A–18D show the profiles of four curved ground sample surfaces (Ra=0.08, 0.29, 0.66, 1.24) measured by Surftest 501. FIG. 19 shows measurement curves of detected intensity vs. gap distance for the sample surfaces. FIG. 20 is the relation a curve between the detected maximum intensity and the roughness Ra for the curved ground sample surfaces.

It can be seen from the above results that the maximum intensity is correlated to roughness value for any type of surface irrespective of machining type. This correlation can be used to determine the roughness of a surface with the aid of pre-calibration using reference roughness measurement results.

Based on the above described knowledge, monitoring of surface roughness during machining of a given sample using a specific machine tool is performed as follows. During actual surface monitoring, the head surface of the sensor head is maintained parallel to the measurement surface. As taught by U.S. Pat. No. 5,410,410, the sensor head used in the present invention has the capability to detect deviation from parallel with the measurement surface. Therefore, using this capability, ready adjustment in the case of deviation from parallel can be made easily.

Figure 21:
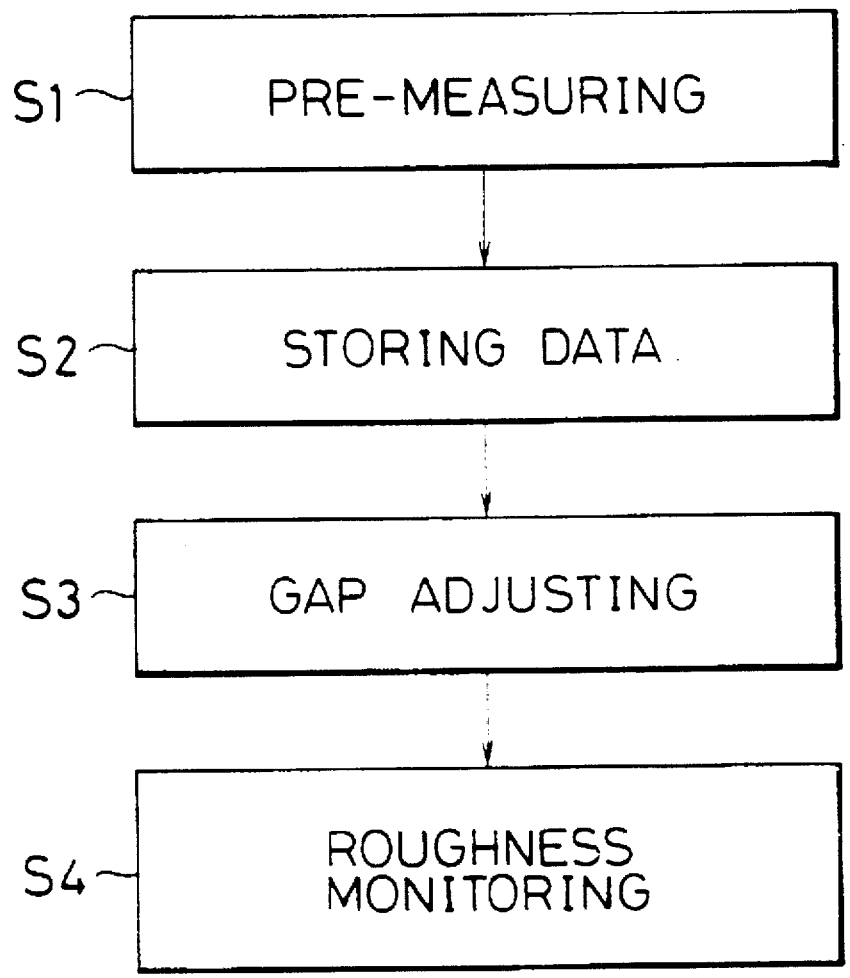
FIG. 21 shows surface roughness monitoring steps in accordance with an embodiment of the invention.

FIG. 21 outlines the surface roughness monitoring steps. Steps S1 to S3 are calibration steps. In the pre-measuring step S1, the probe is used to perform measurement with respect to a plurality of reference samples obtained under a plurality of different processing conditions, and a first correlation between gap distance and detected intensity is found for each. As is clear from FIGS. 14, 17 and 20, from these correlations there can be obtained second correlations between maximum intensity and surface roughness value, which differ with type of machining, and, therefore, in step S2, the second correlations of the maximum intensity vs. surface roughness are searched to be stored in a memory or the like.

Next, in the gap adjusting step S3, the probe is set to such a gap distance that the maximum intensity is obtained, based on the first correlation of detected intensity vs. gap distance obtained in the pre-measuring step S1 for the reference sample surface machined under the processing conditions to be monitored. As can be seen from FIGS. 11A and 11B, although the detected intensity vs. gap distance curve differs with the processing conditions, the gap distance at which the maximum intensity is obtained is substantially constant so long as the processing conditions are constant.

Step S4 is the roughness monitoring step for monitoring the surface roughness for to-be-measured samples accompanying the actual machining. In this step S4, the maximum intensity of the machined surface at the gap distance set in step S3 is monitored in real time, and roughness is discriminated based on the second correlation between maximum intensity and roughness value stored in the memory beforehand.

Because of the simplicity of the measurement method, it is easy to implement the measurement method into practical application. For example, the sensor head can be attached to the spindle of a CNC machine tool just like a regular tool to allow the required movement, and the computation can be performed by the computer of the controller of the CNC machine. By such an application, on-line surface roughness monitoring and control can be performed. Therefore, The method of the present invention may be a suitable approach to surface quality monitoring for productive machining system.

Another attractive feature of the method of the present invention is that the same measuring head can also be used to autonomously measure both incline angle and position coordinate for a sculptured surface in a non-contact manner with the aid of a coordinate measuring machine and related software and algorithms which were developed early by the inventor. This provides a potential innovation to integrate non-contact surface coordinate measurement and roughness measurement into one single measurement probe, or into one single measuring machine, which, obviously, will be very helpful to the development of integrated, multi-purpose measuring machines.

The present invention thus provides the following effects:

(a) Simple, fast, on-line, easy to implement and easy to perform surface roughness measurement system is provided for productive manufacturing systems such as CNC machine tools and machining centers.

(b) It does not have the drawbacks of the many other non-contact surface roughness measurement methods proposed heretofore.

(c) Because of the simplicity of implementation, this fiber-optic method may find prospective applications in the future.

(d) By properly arranging fiber sensors, the sensor head is independent of the texture orientation of the sample surfaces.

(e) For the same type of surface, the detected maximum intensity has a good correlation to the roughness values of the sample surfaces.

(f) The method of the present invention provides a potential possibility to incorporate surface roughness measurement and surface position coordinate and inclination angle measurement into one single measurement probe based on the previous research result on autonomous sculptured surface measurement system achieved by the inventor.

What is claimed is:

1. A method of surface roughness measurement using a fiber-optic probe wherein said probe has at least one sensor head constituted of a light-emitting fiber and multiple light-receiving fibers disposed coaxially with the light-emitting fiber, the method comprising the steps of:

(a) directing a light beam from the sensor head onto each of multiple reference samples machined under a plurality of different processing conditions, and pre-measuring a first correlation between detected intensity and gap distance for each of the reference samples, the detected intensity being defined as a sum of outputs of the light-receiving fibers, the gap distance being defined as a distance between the sensor head and a surface of the reference sample;

(b) searching a second correlation between maximum intensity defined as a peak of the detected intensity in a predetermined range of the gap distance and surface roughness, based on the first correlation obtained in step (a), and storing the second correlation in a memory;

(c) adjusting the gap distance so as to set the probe in a position at which the maximum intensity is obtained, based on the first correlation for the reference sample machined under the processing conditions to be monitored; and (d) monitoring detected intensity obtained at the gap distance set in step (c) for a to-be-measured sample, and determining surface roughness thereof based on the second correlation stored in the memory in advance.

2. The method according to claim 1, wherein the sensor head comprises the light-emitting fiber and eight light-receiving fibers disposed coaxially therewith, four of the light-receiving fibers being symmetrically disposed on a first axis passing through a light-emitting surface of the light-emitting fiber to lie on opposite sides of the light-emitting fiber and the remaining four of the light-receiving fibers being symmetrically disposed on a second axis perpendicular to the first axis to lie on opposite sides of the light-emitting fiber.

3. The method according to claim 1, wherein the fiber optic probe is attached to a machine tool, and the monitoring step (d) is performed during a machining process of the machine tool.

* * * * *

UNITED STATES PATENT AND TRADEMARK OFFICE
CERTIFICATE OF CORRECTION

PATENT NO.   : 5,757,496
DATED        : May 26, 1998
INVENTOR(S)  : Kazuo Yamazaki It is certified that error appears in the above-identified patent and that said Letters Patent is hereby corrected as shown below:

In the Drawings, Sheet 6 of 14, FIG. 9 heading: "ARBITARY" should read --ARBITRARY--.

Column 1 Line 26 "before goes" should read --before it goes--.

Column 1 Line 58 "is need" should read --is needed--.

Column 2 Line 17 "they only measured only" should read --they measured only--.

Column 2 Line 18 "no any surface" should read --no surface--.

Column 4 Line 13 "attached the" should read --attached to the--.

Column 5 Line 12 "For most engineering surface" should read --For most engineering surfaces--.

Column 5 Line 32 after "bigger" delete --is--.

Column 5 Line 32 after "smoother" delete --is--.

Column 6 Line 6 between "area" and "within" insert --is--.

Column 6 Line 7 after "considered to" insert --be--.

Column 6 Line 18 "The integral" should read --The integer--.

Column 6 Line 38 "to-be-measures" should read --to-be-measured--.

Column 6 Line 50 "related to" should read --relate to--.

Column 6 Line 59 "may not valid" should read --may not be valid--.

UNITED STATES PATENT AND TRADEMARK OFFICE
CERTIFICATE OF CORRECTION

PATENT NO. : 5,757,496
DATED : May 26, 1998
INVENTOR(S) : Kazuo Yamazaki

It is certified that error appears in the above-identified patent and that said Letters Patent is hereby corrected as shown below:

Column 7 Line 39 "how" should read --show--.

Column 7 Line 42 "the later" should read --the latter--.

Column 7 Line 49 "intensity are" should read --intensities are--.

Column 7 Line 53 after "maximum intensity" delete --are--.

Column 7 Line 56 "rely" should read --relies--.

Column 7 Line 57 after "regarding" delete --to--.

Column 8 Line 32 "relation a curve" should read --relation curve--.

Column 9 Line 9 after "machining" delete comma (,) and insert period --.--.

Column 9 Line 22 "Therefore, The" should read --Therefore, the--.

Signed and Sealed this

Sixth Day of October, 1998

*Attest:*

BRUCE LEHMAN

*Attesting Officer*     *Commissioner of Patents and Trademarks*